United States Patent
Kies

(10) Patent No.: US 9,527,573 B2
(45) Date of Patent: Dec. 27, 2016

(54) PRESSURIZED AIRCRAFT FUSELAGE COMPRISING A PRESSURE BULKHEAD MOVABLY FIXED TO THE FUSELAGE

(71) Applicant: Airbus Operations GmbH, Hamburg (DE)

(72) Inventor: Hendrik-Tillmann Kies, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/564,223

(22) Filed: Dec. 9, 2014

(65) Prior Publication Data
US 2015/0166167 A1    Jun. 18, 2015

(30) Foreign Application Priority Data
Dec. 18, 2013    (DE) .......................... 10 2013 114 391

(51) Int. Cl.
*B64C 1/10*    (2006.01)
*B64C 1/06*    (2006.01)

(52) U.S. Cl.
CPC ...... *B64C 1/10* (2013.01); *B64C 1/069* (2013.01)

(58) Field of Classification Search
CPC .................................... B64C 1/10; B64C 1/069
See application file for complete search history.

(56) References Cited

U.S. PATENT DOCUMENTS

| | | | |
|---|---|---|---|
| 4,728,059 A * | 3/1988 | Stephen | B64D 25/00 244/119 |
| 6,276,866 B1 | 8/2001 | Rutan | |
| 6,378,805 B1 | 4/2002 | Stephan et al. | |
| 7,503,523 B2 | 3/2009 | Perez-Sanchez | |
| 2010/0025867 A1 | 2/2010 | Benton et al. | |
| 2010/0176241 A1 * | 7/2010 | Meyer | B64C 1/36 244/119 |
| 2010/0230539 A1 | 9/2010 | Mischereit et al. | |
| 2010/0258673 A1 | 10/2010 | Garcia Laja et al. | |

(Continued)

FOREIGN PATENT DOCUMENTS

| | | |
|---|---|---|
| AT | 405 813 B | 11/1999 |
| DE | 10 2009 049 007 A1 | 4/2011 |

(Continued)

OTHER PUBLICATIONS

Google Translate—DE 102013114291.1 claim 6 partial machine translation; accessed Jan. 20, 2016.*

(Continued)

*Primary Examiner* — Tien Dinh
*Assistant Examiner* — Alexander V Giczy
(74) *Attorney, Agent, or Firm* — Lerner, David, Littenberg, Krumholz & Mentlik, LLP

(57) ABSTRACT

A pressurized aircraft fuselage includes a pressure bulkhead installed on a fuselage structure, which forms a barrier between an internal pressurized cabin area and an outside area. The edge of the pressure bulkhead is circumferentially attached to the fuselage structure. In particular, at least one clamping element is arranged inside a mounting bracket having an open trapezoidal-shaped channel formed by a base section of the mounting bracket and non-parallel sides of the mounting bracket. An edge of the pressure bulkhead is inserted in the trapezoidal shaped mounting bracket, in order to form a clamping connection for the pressure bulkhead towards the fuselage structure.

10 Claims, 2 Drawing Sheets

(56) References Cited

U.S. PATENT DOCUMENTS

| | | | | |
|---|---|---|---|---|
| 2011/0024563 A1* | 2/2011 | Bauer | ................... | B64C 1/10 |
| | | | | 244/120 |
| 2011/0084166 A1* | 4/2011 | Hartel | ................... | B64C 1/10 |
| | | | | 244/120 |
| 2011/0233334 A1* | 9/2011 | Stephan | ................. | B64C 1/10 |
| | | | | 244/119 |
| 2012/0228427 A1 | 9/2012 | Sayilgan et al. | | |
| 2012/0280083 A1* | 11/2012 | Dazet | ............. | B29C 45/14467 |
| | | | | 244/131 |
| 2014/0370227 A1* | 12/2014 | Diep | ................... | B64D 45/00 |
| | | | | 428/66.4 |

FOREIGN PATENT DOCUMENTS

| | | | |
|---|---|---|---|
| DE | 10 2007 044 388 B4 | 8/2012 | |
| DE | 10 2012 005 451 A1 | 9/2013 | |
| DE | 10 2012 011 027 A1 | 12/2013 | |
| WO | WO 2012091695 A1 * | 7/2012 | ......... B29C 65/5078 |
| WO | 2013139716 A1 | 9/2013 | |
| WO | 2013182566 A1 | 12/2013 | |

OTHER PUBLICATIONS

German Search Report (10 2013 114 391.1) dated Feb. 13, 2014.
European Search Report May 18, 2015.

* cited by examiner

PRESSURIZED AIRCRAFT FUSELAGE COMPRISING A PRESSURE BULKHEAD MOVABLY FIXED TO THE FUSELAGE

FIELD OF THE INVENTION

The technical field relates to a pressurized aircraft fuselage, comprising a pressure bulkhead installed on a fuselage structure, which forms a barrier between an internal pressurized cabin area and an outside area, wherein the edge of the pressure bulkhead is circumferentially attached to the fuselage structure by movable fastening means.

BACKGROUND OF THE INVENTION

The pressure bulkhead for an aircraft is the structural component which supports the pressure of the fuselage of the aircraft at its ends. The stress that the fuselage of the aircraft is subjected to particularly when said fuselage is depressurized, in this case adding the negative pressure of the fuselage with the stress due, for example, to the load from the vertical stabilizer or in general flight loads are adding and interacting loads to the rear pressure bulkheads and its component parts. In addition, it is even more necessary with modern aircraft designs to manufacture pressure bulkheads minimizing their weight while at the same time maintaining their stiffness.

Pressure bulkheads made of metal, particularly aluminum or titanium, are known in the art, although these designs require metal stiffeners providing these bulkheads with sufficient stiffness to support fuselage stress.

In addition, pressure bulkheads made of a composite material or reinforced plastic materials, mainly carbon fiber reinforced with plastic, are known which also require stiffeners to support stress coming from a fuselage.

The US 2010/0258673 A1 discloses a cured rear pressure bulkhead comprising three layers, namely an outer and inner layer symmetrical in relation to one another, are formed by a fiber laminate, the intermediate layer or core being formed by light weight material. With such a sandwich-type shape, the resulting bulkhead is able to withstand the bending loads coming from the stress and pressurization of the fuselage without having to increase its stiffness by means of the use of some type of stiffener.

To allow the assembly of said bulkhead to the aircraft fuselage structure, the bulkhead further comprises a ring made by means of resin transfer molding, or it is made of titanium, divided into several pieces to facilitate non-movable attaching the bulkhead to the fuselage structure. The ends of the curved pressure bulkhead are formed only by one fiber laminate, such that these ends are attached to the ring by means of rivets, in turn attaching sections of the ring to the aircraft fuselage structure by means of the corresponding rivets.

In contrast to the forgoing described prior art the DE 10 2012 005 451 A1 discloses a flat shaped pressure bulkhead for a fuselage of an aircraft according to a preferred embodiment of a pressure bulkhead of the present invention.

The flat pressure bulkhead which is preferably arranged in the rear section of the fuselage to form an internal pressurized section is attached at the rim side of the fuselage shell. The pressure bulkhead comprises a lenticular cross section and a sandwich build-up which includes a foam core that is surrounded by two oppositely positioned outer shells.

The connection of the flat pressure bulkhead to the fuselage is realized via movable fastening means in form of hinge elements. The joining of the hinge elements to the fuselage sections is realized via mechanical connecting elements such a rivets, which are guided through an outer flange and the fuselage sections.

BRIEF SUMMARY OF THE INVENTION

An aspect of the present invention may provide a simple and stable mechanical connection between a preferably flat pressure bulkhead and a fuselage structure of an airplane for high torsional and radial stiffness.

In addition, other aspects, desirable features and characteristics will become apparent from the subsequent summary and detailed description, and the appended claims, taken in conjunction with the accompanying drawings and this background.

An aspect of the present invention proposes movable fastening means for attaching the preferably flat bulkhead to the fuselage structure which comprise at least one clamping element which is arranged inside a trapezoidal mounting bracket and which corresponds to the edge of the pressure bulkhead, in order to form a clamping connection for the pressure bulkhead towards the fuselage structure.

In other words, the solution according to an embodiment of the present invention provides a kind of self-locking through the tension and deflection of the pressure bulkhead resulted by the compressive stress and the clamping effect of the trapezoidal mountings and the wedging effect through the at least one clamping element.

According to a preferred embodiment of the invention two clamping elements are arranged inside the trapezoidal shaped mounting bracket, wherein one clamping element corresponds to each side of the inserted edge of the pressure bulkhead. Using two clamping elements on each side the pressure bulkhead the clamping effect increases and provides a flexible, tolerance compensating jointless connection of the pressure bulkhead onto the fuselage structure.

Preferably, the clamping element according to an embodiment of the present invention is designed as a tension ring for pressing the edge of the pressure bulkhead against the corresponding inner wall section of the mounting bracket. The self sealing through the tension ring imaginative a circumference ring and the form closure made out of elastic and soft material.

The inside of the mounting bracket forms a dynamic area for the edge section of the pressure bulkhead in order to provide free space for deformations, deflection and movement of the pressure bulkhead relatively to the fastening means during operation. Furthermore, the inside of the mounting bracket can be used as an internal feed-through area for conduits, cables or the like. The said feed-through area is preferably arranged between the outer rim of the pressure bulkhead and the base section of the mounting bracket.

According to another optional aspect of the invention it is recommended to attach the trapezoidal shaped mounting bracket onto the fuselage structure by means of a rivet connection, comprising several adjacent lines of rivets. These rivets are only needed for the connection between the fuselage structure and the mounting bracket, which decrease the number of required rivets.

According to another preferred embodiment of the invention a tension actuator is provided for stressing the tension ring designed clamping element, in order to increase the clamping force. The tension actuator is preferably designed as a spindle gear motor which moves the open ends of the tension ring together in order to decrease the diameter of the tension ring. Such an active tension ring contraction could be necessary for deep pressurized phases of the air craft during landing or at the ground level in order to hold the pressure bulkhead in place relatively to the fuselage structure.

Alternatively or additionally to a tension actuator it is also possible to use a pressing ring which is arranged adjacent to ring shaped clamping element for the same purpose. Also such a pressing ring which preferably surrounds the ring shaped clamping element insures the right position of the pressure bulkhead relatively to the fuselage structure at unloaded condition and increases the clamping force due to pressing against the clamping element in radial direction.

In order to further increase the clamping force of the solution according to an embodiment of the present invention the ring shaped clamping element is provided with a circular or wedged cross-section. Due to different cross-sections a geometrical force control is provided for the whole system.

According to another aspect of the present invention it is recommended that on the outer rim of the pressure bulkhead a radial extending torus is provided for a clamping force distribution to both clamping elements, which are arranged to both sides of the pressure bulkhead. The said torus also prevents shaft slipping during high stress situations for the pressure bulkhead and serves as a further optional secure feature for the moveable fastening solution according to an embodiment of the present invention.

Other features and details of the present invention will be understood from the following description of different embodiments of its objects in relation to the attached figures.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

In the figures the same design elements are provided with the same reference numbers, wherein there is plurality of the same design elements in one figure just one of these elements is provided with a reference number in the interests of clarity. All figures are schematic.

DETAILED DESCRIPTION

Figure 1:
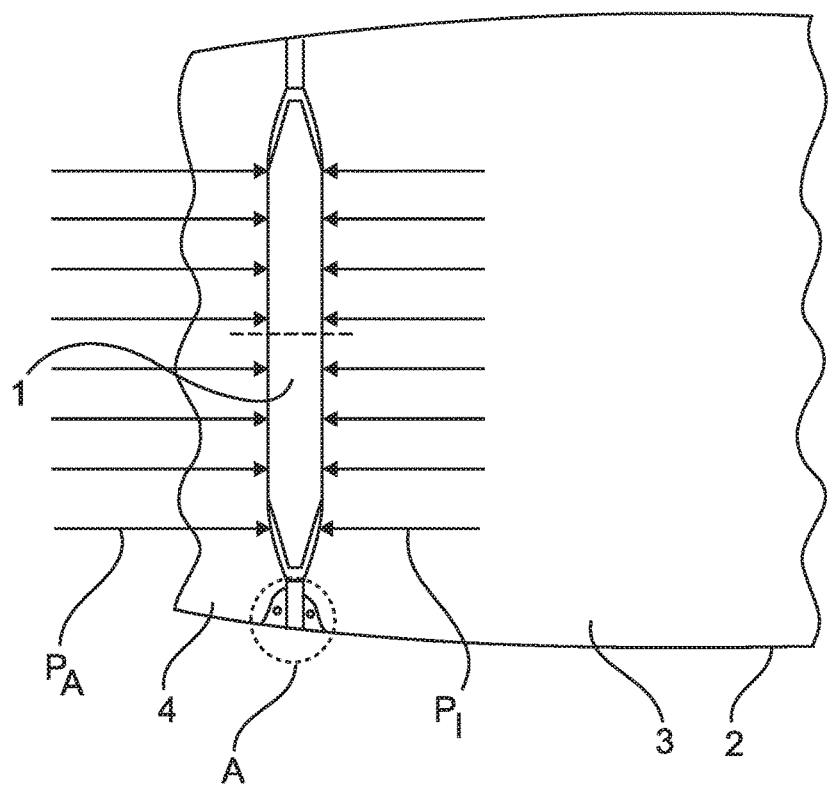
FIG. 1 shows a schematic side view of the position of a rear pressure bulkhead in a typical pressurized aircraft fuselage.

The following detailed description is merely exemplary in nature and is not intended to limit the present disclosure or the application and uses of the present disclosure. Furthermore, there is no intention to be bound by any theory presented in the preceding background or the following detailed description In view of FIG. 1 a pressure bulkhead 1 is provided for installing on a fuselage structure 2 of an aircraft. The pressure bulkhead 1 forms a barrier between an internal pressurized cabin area 3 and an outside area 4 which represents the environment. The flat shaped pressure bulkhead 1 is stressed with a pressure $p_I$ from the internal pressurized cabin area 3 at one side. At the opposite side the pressure bulkhead 1 is stressed by a pressure $p_A$ which corresponds to the atmospheric pressure outside the aircraft.

Due to the pressure difference between the inside pressure $p_I$ and the outside pressure $p_A$ the flat-shaped pressure bulkhead 1 is elastically deformated during operation and needs moveable fastening means in relation to the fuselage structure 2. Thus, the edge of the pressure bulkhead 1 is circumferentially attached to the fuselage structure 2 by special fastening means in the area of detail A.

Figure 2:
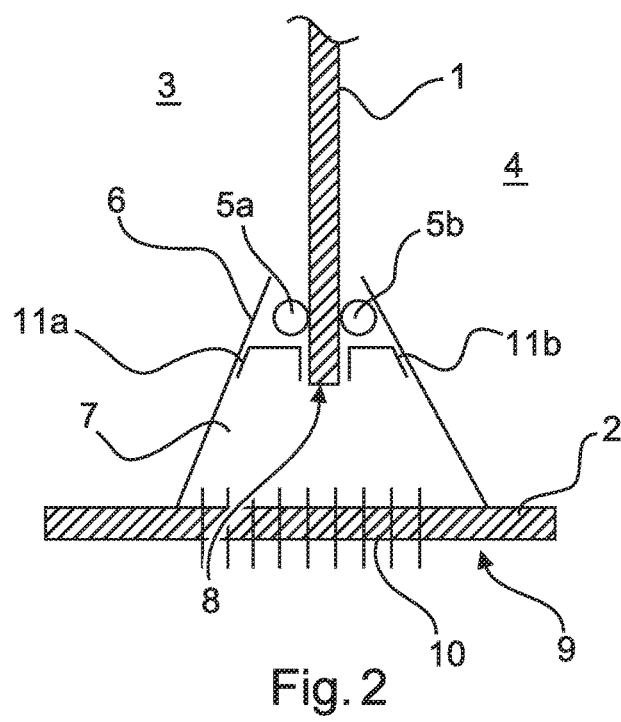
FIG. 2 shows a side view of detail A of FIG. 1 in the area of the moveable fastening means for attaching the pressure bulkhead to the fuselage structure in a first embodiment.

According to FIG. 2 which shows in enlarged view of detail A the moveable fastening means comprise to clamping elements 5a and 5b which are arranged inside a trapezoidal shaped mounting bracket 6 which corresponds to an inserted edge of a pressure bulkhead 1 in order to form a clamping connection for the pressure bulkhead 1 towards the fuselage structure 2.

Each clamping element 5a and 5b corresponds to a respective side of the inserted edge of the pressure bulkhead 1 and is designed as a tension ring with a circular cross-section. The ring shaped clamping elements 5a and 5b presses the edge of the pressure bulkhead 1 against the corresponding inner walls section of the mounting bracket 6 for fastening.

Additionally, inside the mounting bracket 6 an internal feed-through area 7 is provided. The feed-through area 7 is arranged between the outer rim 8 of the pressure bulkhead 1 and the base section 9 of the mounting bracket 6. The feed-through area 7 is provided for installing lines between the cabin area 3 and the outside area 4 of the aircraft. The pressure bulkhead 1 which forms the border between the said two areas is designed in form of a sandwich structured flat bulkhead. The trapezoidal shaped mounting bracket 6 which is a part of the moveable fastening means is attached to the fuselage structure 2 of the aircraft by means of a rivet connection, comprising several adjacent lines of rivets 10. The ring shaped clamping elements 5a and 5b correspond to an adjacent arranged pressing ring 11a and 11b respectively for increasing the clamping force of the clamping element 5a and 5b.

Figure 3:
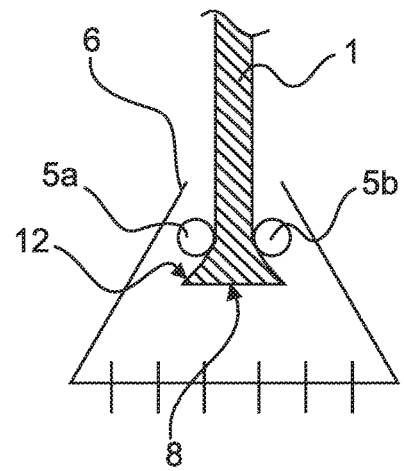
FIG. 3 shows a side view of detail A of FIG. 1 in the area of the moveable fastening means for attaching the pressure bulkhead to the fuselage structure in a second embodiment.

In view of the embodiment as shown FIG. 3 on the outer rim 8 of the pressure bulkhead 1 a radial extending torus 12 is provided. The torus 12 distributes the clamping force of both clamping elements 5a and 5b when the pressure bulkhead 1 moves from the mounting bracket 6 in radial direction.

Figure 4:
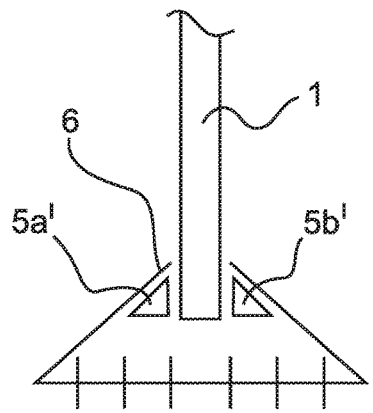
FIG. 4 shows a side view of detail A of FIG. 1 in the area of the moveable fastening means for attaching the pressure bulkhead to the fuselage structure in a third embodiment.

A further embodiment as shown in FIG. 4 illustrates moveable fastening means in which the clamping element 5a' and 5b' have a triangular cross section in order to increase the clamping force, provided by the adjacent inner wall of the mounting bracket 6 onto the edge of the pressure bulkhead 1. Thus, the clamping elements 5a' and 5b' provides a wedging effect to the pressure bulkhead 1.

Figure 5:
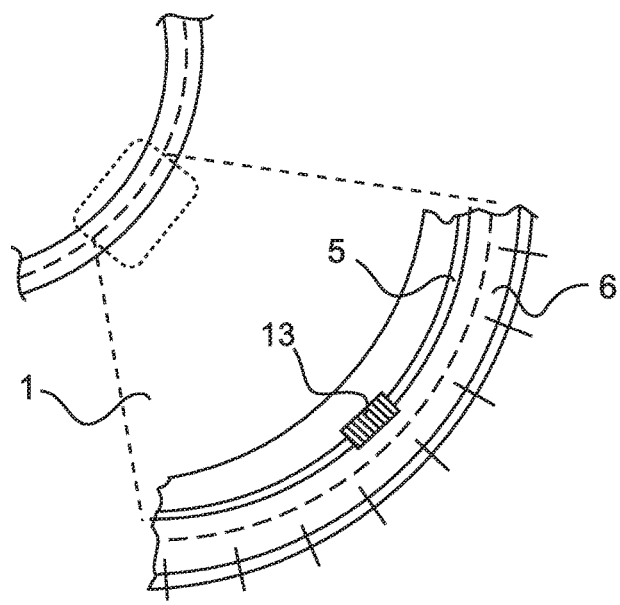
FIG. 5 shows a front view on a section of the pressure bulkhead edge comprising a tension actuator for increasing the clamping force.

According to FIG. 5 a tension actuator 13 is provided for stressing the tension ring designed clamping element 5. The tension actuator 13 comprises an electric motor, which drives a screw gear in order to tighten both ends of the ring shaped clamping element 5.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A pressurized aircraft fuselage comprising:
a pressure bulkhead installed on a fuselage structure, the pressure bulkhead forming a barrier between an internal pressurized cabin area and an outside area; and
movable fastening means circumferentially attaching an edge of the pressure bulkhead to the fuselage structure, wherein the movable fastening means comprise at least a first clamping element arranged inside a mounting bracket having an open trapezoidal-shaped channel formed by a base section of the mounting bracket and non-parallel sides of the mounting bracket; and positioned on the edge of the pressure bulkhead inserted in the mounting bracket, to form a clamping connection for the pressure bulkhead towards the fuselage structure.

2. The pressurized aircraft fuselage according to claim 1, further comprising a second clamping element arranged inside the mounting bracket, wherein the first and second clamping elements are positioned on opposing sides of the inserted edge of the pressure bulkhead, respectively.

3. The pressurized aircraft fuselage according to claim 1, wherein the first clamping element is configured as a tension ring for pressing the inserted edge of the pressure bulkhead against inner wall sections of the mounting bracket.

4. The pressurized aircraft fuselage according to claim 3, further comprising a tension actuator for stressing the tension ring, in order to increase the clamping force.

5. The pressurized aircraft fuselage according to claim 1, wherein the first clamping element is ring-shaped and comprises a circular-shaped cross-section or a wedged-shaped cross-section.

6. The pressurized aircraft fuselage according to claim 1, wherein the first clamping element is ring-shaped and is positioned adjacent a pressing ring for increasing the clamping force.

7. The pressurized aircraft fuselage according to claim 2, wherein the inserted edge of the pressure bulkhead includes an outer rim, and further comprising, on the outer rim of the pressure bulkhead, a circumferentially extending torus for a clamping force distribution to the first and second clamping elements.

8. The pressurized aircraft fuselage according to claim 1, wherein the inserted edge of the pressure bulkhead includes an outer rim, and further comprising, inside the mounting bracket, an internal feed-through area arranged between the outer rim of the pressure bulkhead and the base section of the mounting bracket.

9. The pressurized aircraft fuselage according to claim 1, wherein the pressure bulkhead is configured in a form of a sandwich structured flat bulkhead.

10. The pressurized aircraft fuselage according to claim 1, wherein the mounting bracket is attached to the fuselage structure by a rivet connection, comprising several adjacent lines of rivets.

* * * * *